May 23, 1939.  R. O. CHAFFEE  2,159,363
SNAP FASTENER STUD
Filed Nov. 20, 1936
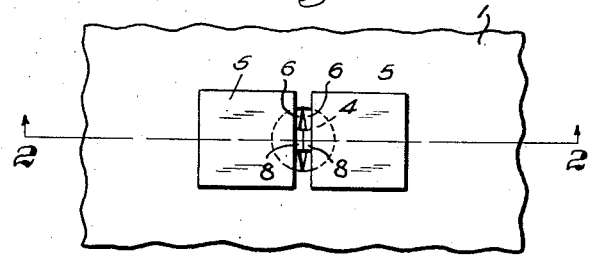
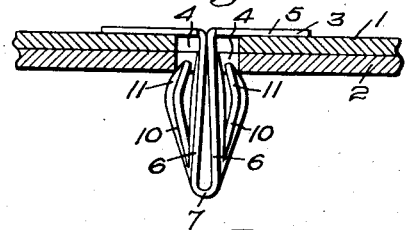
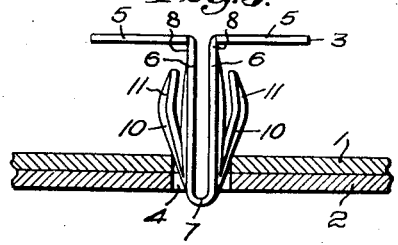
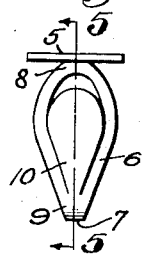
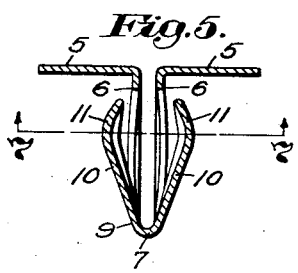
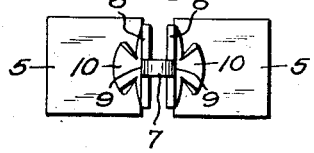
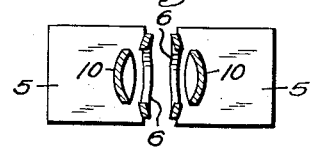
Inventor:
Raymond O. Chaffee,
by Walter L. Jones
Atty Patented May 23, 1939

2,159,363

UNITED STATES PATENT OFFICE 2,159,363

SNAP FASTENER STUD

Raymond O. Chaffee, Belmont, Mass., assignor to United-Carr Fastener Corporation, Cambridge, Mass., a corporation of Massachusetts Application November 20, 1936, Serial No. 111,825

2 Claims. (Cl. 24—213)

My invention relates to improvements in snap fastener stud members.

Referring to the drawing, in which I have illustrated a preferred embodiment of my invention:

Figure 1 is a top plan view of one of my improved snap fastener members showing one use of the same;

Fig. 2 is a section taken along the line 2—2 of Fig. 1;

Fig. 3 is a section similar to that of Fig. 2 but showing my snap fastener member before being moved into final position;

Fig. 4 is a front elevation of my improved snap fastener member per se.

Fig. 5 is a section taken along the line 5—5 of Fig. 4;

Fig. 6 is a bottom plan view of the snap fastener member shown in Fig. 4; and

Fig. 7 is a section taken along the line 7—7 of Fig. 5.

Referring to the drawing, I have illustrated a pair of superposed sheets of material 1 and 2 secured together by means of my improved snap fastener stud member 3. The snap fastener member 3 has a base portion engaging an outside surface of the strip 1 and a shank portion extending through aligned apertures 4 in the strips 1 and 2 and having shoulder portions in spring engagement with an outside surface of the strip 2, as most clearly shown in Fig. 2. Although I have illustrated a preferred use of my snap fastener member in combination with a pair of superposed strips of material, I do not wish to be limited by the same because my fastener member may be used for fastening parts having other forms than those specifically illustrated and described.

Referring specifically to my preferred form of fastener member, as most clearly illustrated in Figs. 4-7 of the drawing, I have provided a fastener having a base means comprising a pair of rectangular arms 5—5. Legs 6—6 extend from respective inner edges of the arms 5 in substantially right-angular relation thereto and are joined at their leading end to form a nose 7. The legs 6—6, in my preferred form, form fastener action-controlling portions 8—8, near the point where they join the base portions 5—5, to abut each other upon slight movement of the legs 6—6 toward each other. The outside edges of each of the legs 6—6 converge from the action-controlling portion B and then taper to a relatively narrow portion 9 adjacent the leading end 7 so as to form a substantially pear-shaped leg portion. The narrow construction of the material of the legs 6—6 at the leading end 7 enables the legs 6—6 to yield relative to each other for a purpose which will be hereinafter described. Each of the legs 6—6 has a socket-engaging portion 10 taken from the material within the leg and normally extending out of the plane of the leg. Each of the socket-engaging portions 10 has a substantially bowed formation forming a shoulder 11 and each portion 10 has a relatively narrow portion at the point at which it joins the material of the respective leg. The relatively narrow portion at the junction of the socket-engaging portion 10 with its respective leg 6 enables the portion 10 to yield relative to the leg 6 for a purpose to be described.

The action of the stud may be described as follows, and it should be understood that the action is controlled by the shape and arrangement of the parts, which may be varied to secure the desired holding power, and the adjustment to variations in thickness of parts to be secured together. Thus the leading end 7 of the fastener member is moved into the apertures 4—4 of the strips 1 and 2 as shown in Fig. 3. Then as the stud shank is forced through the aperture, the portions 10—10 engage the material surrounding the aperture and as pressure is continued the portions 10—10 are forced toward each other. During this action the legs 6—6 are moved toward each other until the portions 8—8 abut and provide a stiffening action adjacent to the base of the fastener. After the portions 10—10 have passed by their greatest point of separation, they expand so that the shoulders 11—11 engage the wall surrounding the aperture 4 of the strip 2 with sufficient force to hold the strips 1 and 2 tightly together and under tension.

My improved fastener members are simple in construction and inexpensive to manufacture. Further, they adapt themselves to apertures of slightly varying diameters and to various thicknesses of material.

Although I have illustrated and described a preferred embodiment of my invention, I do not wish to be limited thereby because the scope of my invention is best set forth in the following claims:

I claim:

1. A snap fastener stud adapted for entry into and engagement with a part having a circular aperture and having base means, a shank formed by opposed yieldable legs joined together at an end of the shank spaced from said base means, and a yieldable shouldered portion having one end integral with one of said yieldable legs and its opposite end being free and disposed laterally beyond the plane of said leg, opposed narrow edges of said shouldered portion converging from adjacent its free end toward its end integral with said leg, and said shouldered portion being yieldable independently of said leg.

2. A snap fastener stud adapted for entry into and engagement with a part having a circular aperture and having base means, a shank formed by opposed yieldable legs joined together at an end of said shank spaced from said base means and each of said legs having a yieldable shouldered portion yieldable independently of said leg, each of said yieldable shouldered portions having one end integral with said respective leg and its opposite end free and disposed laterally beyond the plane of said leg, opposed narrow edges of each of said shouldered portions converging from adjacent its free end toward its end integral with said respective leg and the opposite narrow edges of each of said legs converging toward the joined end of the shank to provide a tapered entering portion on the fastener stud.

RAYMOND O. CHAFFEE.